Feb. 4, 1964   J. D. HAYNES   3,120,375
AUTO HOLD-DOWN WINCH AND TRACK ASSEMBLY
Filed April 18, 1961
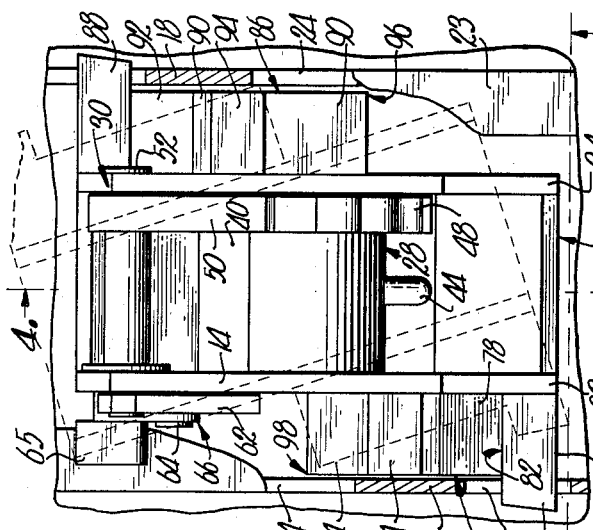
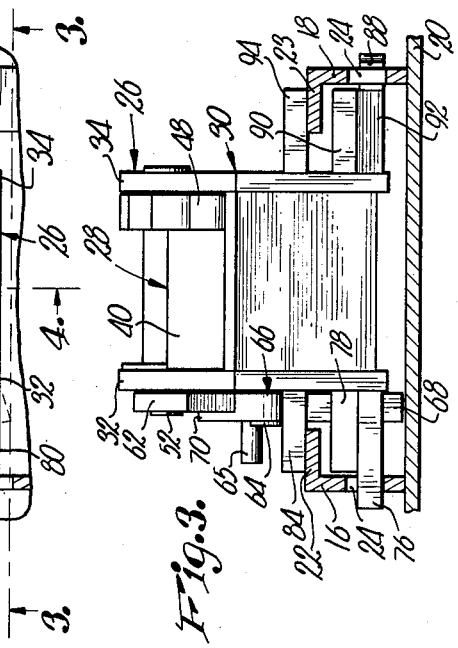
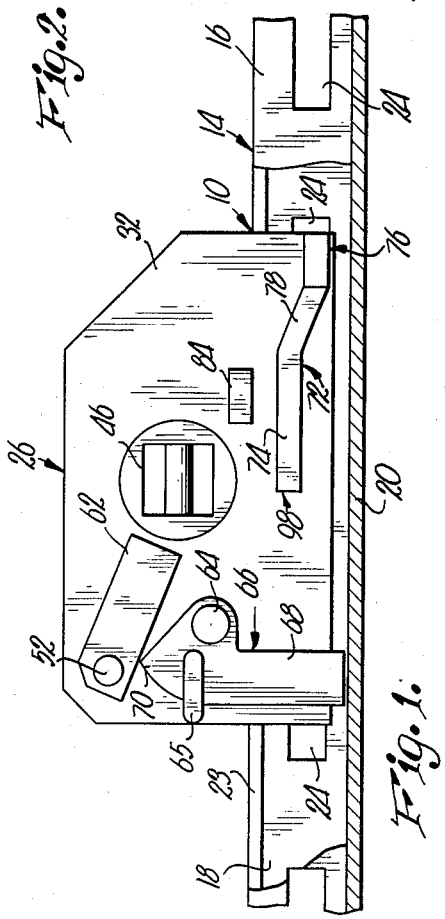
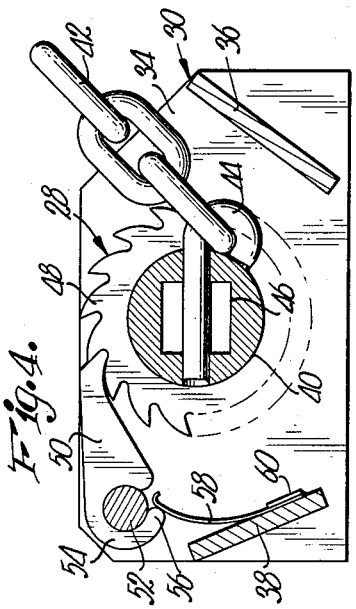
INVENTOR.
James D. Haynes
BY
Hovey, Schmidt, Johnson & Hovey
ATTORNEYS.

United States Patent Office 3,120,375
Patented Feb. 4, 1964

3,120,375
AUTO HOLD-DOWN WINCH AND TRACK ASSEMBLY
James D. Haynes, Kansas City, Kans., assignor to The Darby Corporation, Kansas City, Kans., a corporation of Kansas
Filed Apr. 18, 1961, Ser. No. 103,917
10 Claims. (Cl. 254—150)

This invention relates to holding assemblies, and more particularly, to a winch type unit for mooring automobiles or the like to the deck of transporting vehicles during cross-country shipment.

The primary object of this invention is to provide in such an assembly, structure capable of rendering it quickly and easily adjustable, yet highly safe in its holding characteristics.

An important object of the instant invention is to provide an assembly having a positive lock safety feature operable to cause the winch to remain inoperative until the support thereof is securely locked against movement along a track.

Conversely, it is an equally important object of the present invention to provide an assembly wherein the lock will positively prevent the mooring unit from moving in its track while the winch is engaged; and wherein components of the winch operate during normal use to prevent disengagement of the lock from its intended operating position.

A further object of this invention is the provision in the holding assembly of a track having a pair of rails along which the mooring unit may be readily shifted to a selection of holding positions, the rails in turn having flanges disposed to not only insure that the mooring unit will not be lost or misappropriated from the remainder of the assembly, but serve as additional means to carry the load of the taut chain of the winch.

In the drawing:

FIGURE 1 is a side elevational view of a holding winch and track assembly made pursuant to my present invention, a part of one rail of the track being broken away and in section;

FIG. 2 is a top plan view with parts of the rail flanges broken away to reveal details of construction and the position of the body when disengaged from the rails for adjustment indicated in broken lines;

FIG. 3 is a cross-sectional view taken on line 3—3 of FIG. 2; and

FIG. 4 is a vertical, cross-sectional view taken on line 4—4 of FIG. 2, but with the track eliminated.

The present invention is particularly directed to a holding assembly adapted for holding objects at a predetermined position relative to a vehicle deck or the like, and is especially useful in tying automobiles securely in place on the deck of a transport carrier such as railroad cars for cross-country shipment. Obviously, such a holding assembly would have a broad range of uses, but for purposes of explanation, the use for securing automobiles to transporting vehicles is suggested, and no restriction to such use is intended.

Inasmuch as most automobiles manufactured today are shipped to the various points throughout the country by railroad transporting cars or highway transport trailers and semi-trailers, a need has arisen for holding apparatus designed to hold the transported automobile securely in place during shipment. Often the decks of such carriers are positioned at a great angle from the horizontal in order to allow for "stacking" of the automobiles to provide for greater unit hauling capacity without unreasonably increasing the length or width of the carrier. When steep inclination of the decks of the carriers is used, it becomes even more imperative that the requirement for the holding apparatus be strong and capable of being securely locked to prevent any shifting of the automobiles.

Automobiles to be transported are not made to any standard size or length, thus the positioning of them on the carrier for any particular haul will vary greatly, depending on the make, model and body style of the unit transported. In order to provide for the best possible mooring for each vehicle, it is necessary that the various holding devices be readily shiftable to a wide selection of positions on the carrier. Winch-type holding devices have been found to be well suited to provide the necessary security for the loaded units as well as being well adapted for quick and easy attachment.

In the form of the invention chosen for illustration, a holding assembly generally enumerated 10, includes a mooring unit 26 and an elongated track 14, comprising a bottom 20 and a pair of spaced, vertical, longitudinal rails 16 and 18, rigidly secured by welding or other suitable means to bottom 20, which may constitute the deck of an automobile carrier or the like. Rails 16 and 18 are provided along their upper edges with perpendicularly and inwardly protruding flanges 22 and 23 respectively, extending the length thereof as best shown in FIGS. 2 and 3. A horizontal series of rectangular, intermittent openings or slots 24 are disposed at regular intervals in the vertical portion of each rail 16 and 18.

Adapted to be disposed between the rails as illustrated, is the holding means or mooring unit 26, which includes a winch 28 and a body 30, the latter comprising a pair of polygonally-shaped, spaced side panels or supports 32 and 34 rigidly secured to opposite ends of crossbars 36 and 38, preferably by welding.

Side panels 32 and 34 journal a winding drum 40, forming a part of winch 28, having a tie means such as a chain 42 securely attached thereto by eyebolt 44 traversing drum 40 and preferably welded thereto. Drum 40 is provided with a polygonal bore 46 for receiving a crank (not shown) or other suitable means to manually rotate drum 40. A toothed ratchet 48 is rigidly connected to drum 40 adjacent panel 34.

A shaft 52, rotatable in panels 32 and 34, has a pawl 50 rigidly connected thereto adjacent panel 34 in position to engage ratchet 48. Pawl 50 has a semicircular finger 54 embracing shaft 52 and terminating in an arcuate end 56, as appears in FIG. 4. An elongated, generally flat spring 58 has its lower end secured to bar 38, preferably by underlying a plate 60, the latter of which may be welded to the bar 38. The upper arcuate end of spring 58 engages end 56 when pawl 50 engages ratchet 48, thereby resisting any tendency of rotation of pawl 50 from the locked position. A lever 62 exterior of panel 32 joins rigidly with shaft 52.

A swingable L-shaped latch member 66, provided with an integral finger piece 65, and disposed exteriorly of panel 32, is supported by the latter by a pivot pin 64. Elongated leg or insert 68 of latch 66 is disposed between panel 32 and flange 22 when in its vertical position as illustrated. Pin 64 is so located that an apex 70 on member 66 will engage lever 62 (when pawl 50 is engaged with ratchet 48), if leg 68 tends to swing from between panel 32 and flange 22. A wing 72, perpendicular to and extending outwardly from panel 32, has an elongated, upper section 74 connected to a projection or ear 76 by an inclined web 78. Section 74 is parallel to ear 76 and deck 20. Ear 76 extends outwardly from plate 32 far enough to pass through slots 24 in rail 16 when panel 32 is parallel to the latter, and has a side 80 slightly longer than a side 82. A preferably rectangular plate 84 overlies flange 22 and is parallel to and spaced from section 74.

A wing 86, having an ear 88, extends perpendicularly outwardly from panel 34 and has an upper section 90 connected to ear 88 by an inclined web 92. It will be noted in FIG. 2 that section 90 is somewhat longer than section 74. Ear 88 is oppositely similar to ear 76. A plate 94 overlies flange 23 and is parallel to and spaced from section 90.

In operation, unit 26 is disposed between rails 16 and 18 with sections 74 and 90 underlying flanges 22 and 23 respectively. Ears 76 and 88 engage rails 16 and 18 through slots 24, thus positively locking unit 26 from longitudinal movement along track 14 and thereby providing a stationary anchor for securing automobiles or other objects to bottom 20. Panels 32 and 34 normally extend generally parallel to rails 16 and 18 and are held in this position by leg 68.

One end of chain 42 is securely fastened to an automobile to be held in place. A crank (not shown) having a suitable configuration, may be fitted into bore 46 and the winch 28 may be turned clockwise (viewing FIG. 4), thereby winding chain 42 on drum 40. Pawl 50 is biased by spring 58 to automatically engage ratchet 48 to prevent retrograde rotation of drum 40. When the desired tension is imparted to chain 42, the crank is removed from bore 46 and unit 26 will remain in position, securely holding the automobile in place on bottom 20. It will be appreciated that as many assemblies 10 as are desired may be utilized for this purpose, but it is anticipated that at least four will normally be necessary to secure each automobile in place. In this connection two parallel tracks, each provided with a pair of holding units, may be employed so that two units may be tied to the front and two to the rear of the vehicle.

Any tendency of the load to cant unit 26 within track 14 in a clockwise direction, viewing FIG. 2, about a vertical axis through the winch 28, will only tend to more securely lock the unit 26 by further engaging ears 76 and 88 through slots 24. Anticlockwise canting of unit 26 will, on the other hand, have a tendency to disengage the ears 76 and 88 from slots 24. Any tendency for such canting by a load will occur substantially midway between panels 30 and 32 through drum 40 which is equidistant from either end of the unit 26. Accordingly, section 90 extends beyond the axis of rotation of drum 40 so that its corner 96 will engage track 18 and resist such anti-clockwise canting. The straight line distance between corner 96 and leg 68 is such that the unit 26 cannot be canted sufficiently to disengage ears 76 and 88 from slots 24 when leg 68 is in position, as illustrated in FIG. 1.

When it becomes desirable to adjust the anchor to another position along track 14, unit 26 may be disengaged from rails 16 and 18 by withdrawing ears 76 and 88 from slots 24. Lever 62 is first rotated in a counter-clockwise direction viewing FIG. 1, to release pawl 50. The rotation causes spring 58 to snap away from engagement with end 56 and rest upon the outer surface of finger 54, so that it no longer tends to apply rotational bias to pawl 50. Lever 62 must be swung far enough so that member 66 may be rotated in a clockwise direction without apex 70 engaging lever 62. Fingerpiece 65 is provided so that member 66 may be conveniently rotated. Clockwise rotation of member 66 removes leg 68 from a position where it can engage flange 22. The straight line distance from corner 96 to the opposite corner 98 on section 74, is sufficiently shorter than the distance from corner 96 to leg 68 so that unit 26 may be canted anticlockwise to the position shown in broken lines in FIG. 2. This rotation withdraws ears 76 and 88 from slots 24, and unit 26 is free to be moved longitudinally along track 14. Side 80 of ear 76 is longer than side 82 to provide an additional distance which ears 76 must be moved to be disengaged from slot 24.

This additional safety factor is to insure against inadvertent disengagement of unit 26 from rail 16. The center of any inadvertent rotation when unit 26 is securing a load, would necessarily be around the point of engagement of ear 88 with rail 18. Accordingly, it is not necessary that an additional distance be added to ear 88 to provide a safety factor from inadvertent withdrawal of the latter. However, ear 88 is preferably made similar to ear 76 so that unit 26 will more easily slide along track 14, when disengaged.

Sections 74 and 90 are spaced beneath flanges 22 and 23 the same amount as ears 76 and 88 are spaced beneath the upper edge of slots 24. When unit 26 is engaged in holding relationship with a load, a portion of the force is borne by sections 74 and 90 engaging flanges 22 and 23 respectively, and also, a portion is borne by ears 76 and 88 engaging rails 16 and 18 respectively.

The slots 24 and rails 16 and 18 are located to provide a selection of additional positions available to locate unit 26. A number of slots 24 and thus positions available, may vary depending upon the nature of the loads to be hauled and other pertinent factors. The slots 24 are so disposed in rails 16 and 18 so that when ear 76 is seated through rail 16, a complementary slot 24 is available for engaging ear 88 through rail 18. After unit 26 is moved to a new position, ears 76 and 88 are again engaged by clockwise rotation of unit 26. Member 66 is lowered to engage flange 22 and lever 62 is again rotated sufficiently for pawl 50 to engage ratchet 48. The unit 26 is again ready to be used for holding purposes as previously described.

The spacing between flanges 22 and 23 is sufficiently narrow that wings 72 and 86 cannot pass therebetween. Suitable means may be provided to close the ends of track 14 to prevent unit 26 from being readily separable from track 14. This would deter the inadvertent loss or wrongful misappropriation of units 26 from the remainder of the holding assembly.

Plates 84 and 94 are raised off flanges 22 and 23 when the unit is holding a load. At other times, the plates 84 and 94 ride along the top of flanges 22 and 23 respectively, and carry the unit 26 as it is moved longitudinally along track 14. The spacing between the plates 84 and 94, and sections 74 and 90 respectively, is sufficient to allow for rocking movement when the unit 26 is moved longitudinally along rail 14. Should ice, snow, or other impediments become lodged between rails 16 and 18, it is necessary to rock the unit 26 for clearing these objects. The spacing between the plates and the sections is such that no binding upon the flanges 22 and 23 will occur.

The present holding assembly is much better adapted for the purpose of holding objects of various sizes in place than those heretofore suggested because it may be quickly and easily repositioned and is thus more flexible for use with various loads. Despite the characteristics allowing for easy repositioning, the mooring unit of the assembly is positively locked into a secure holding position when the ratchet of the assembly is engaged. It is impossible to engage the winch for holding purposes unless the mooring unit is securely locked into position.

Having thus described the invention, what is claimed as new and desired to be secured by Letters Patent is:

1. In combination with an elongated track having a pair of spaced rails, a mooring unit including an elongated support carried by the track between the rails, said unit and said rails being provided with holding means thereon normally out of interengagement when the unit is in one position with said support angularly disposed with respect to the rails to permit the unit to be shifted longitudinally of the track, said holding means on the unit and rails interlocking to prevent relative movement between the same when the unit is canted sidewise from said one position into a second position with said support being substantially parallel to said rails.

2. In combination with an elongated track having a pair of spaced rails, a mooring unit including a winch having a winding drum and the tie means attached to the drum and adapted to be coiled therearound when the drum is rotated; and a support journaling the drum and carried by the track between the rails, said support and one of said rails being provided with relatively shiftable holding means thereon movable toward and away from the other rail and normally out of interengagement when the unit is in one position with respect to the rails to permit the unit to be shifted longitudinally of the track, said holding means on the support and said one of the rails interlocking to prevent relative movement between the same when the unit is canted sidewise from said one position into a second position thereof.

3. In combination with an elongated track having a pair of spaced rails, a mooring unit including a winch having a winding drum and tie means attached to the drum and adapted to be coiled therearound when the drum is rotated; an elongated support journaling the drum and carried by the track between the rails, said support and said rails being provided with holding means thereon normally out of interengagement when the unit is in one position with said support angularly disposed with respect to the rail to permit the unit to be shifted longitudinally of the track, said holding means on the support and rails interlocking to prevent relative movement between the same when the unit is canted sidewise from said one position into a second position with said support being substantially parallel to said rails; and means carried by said support for movement relative thereto and insertable between the support and one of the rails for retaining the support in said second position.

4. In combination with an elongated track having a pair of spaced rails, a mooring unit including a winch having a winding drum and tie means attached to the drum and adapted to be coiled therearound when the drum is rotated; an elongated support journaling the drum and carried by the track between the rails, said drum and said support being provided with a pawl and ratchet means for releasably holding the drum against retrograde rotation, said support and said rails being provided with holding means thereon normally out of interengagement when the unit is in one position with said support angularly disposed with respect to the rails to permit the unit to be shifted longitudinally of the track, said holding means on the support and rails interlocking to prevent relative movement between the same when the unit is canted sidewise from said one position into a second position with said support being substantially parallel to said rails; an insert shiftably mounted on the support and movable into a location between the support and one of the rails to prevent the movement of the support into said first position to thereby retain the support in said second position; and means coupled with the pawl for holding the latter released from the ratchet when the insert is moved from between the support and the one rail.

5. In combination with an elongated track having a pair of spaced rails, each provided with a side and an inturned flange, a mooring unit including a winch having a winding drum and tie means attached to the drum and adapted to be coiled therearound when the drum is rotated; an elongated support journaling the drum and carried by the track between the rails, said support and said rails being provided with holding means thereon normally out of interengagement when the unit is in one position with said support angularly disposed with respect to the rails to permit the unit to be shifted longitudinally of the track, said holding means on the support and rails interlocking to prevent relative movement between the same when the unit is canted sidewise from said one position into a second position with said support being substantially parallel to said rails; and lateral extensions on the support engaging the flanges when the tie means is taut for holding the support within the track when the support is in said second position.

6. In combination with an elongated track having a pair of spaced rails, each provided with a side having a series of openings spaced longitudinally therealong, a mooring unit including a winch having a winding drum and tie means attached to the drum and adapted to be coiled thereon when the drum is rotated; a support journaling the drum and carried by the track between the rails; and lateral projections on the support normally out of inter-engagement with said openings when the unit is in one position with respect to the rails to permit the unit to be shifted longitudinally of the track, said projections on the support being disposed to enter selected openings of a corresponding rail and thereby locking the support to the rails, when the unit is canted sidewise from said one position thereof into a second position thereof.

7. In combination with an elongated track having a pair of spaced rails, each provided with a side having a series of openings therein spaced longitudinally therealong, a mooring unit including a winch having a winding drum and tie means attached to the drum and adapted to be coiled therearound when the drum is rotated; an elongated support journaling the drum and carried by the track between the rails; and lateral projections on the support, each disposed in spaced relationship diagonally across said support normally out of engagement with said openings when the unit is in one position with said support angularly disposed with respect to the rails to permit the unit to be shifted longitudinally of the track, said projections on the support being disposed to enter selected openings of a corresponding rail and thereby lock the support to the rails, when the unit is canted sidewise from said one position thereof about an axis substantially perpendicular to the axis of rotation of said drum into a second position with said support being substantially parallel to said rails.

8. In combination with an elongated track having a pair of spaced rails, each provided with a side having a series of openings therein spaced longitudinally therealong, a mooring unit including a winch having a winding drum and tie means attached to the drum and adapted to be coiled therearound when the drum is rotated; a support journaling the drum and carried by the track between the rails; lateral projections on the support, each disposed in spaced relationship diagonally across said support normally out of engagement with said openings when the unit is in one position with respect to the rails to permit the unit to be shifted longitudinally of the track, said projections on the support being disposed to enter selected openings of a corresponding rail and thereby lock the support to the rails, when the unit is canted sidewise from said one position thereof about an axis substantially perpendicular to the axis of rotation of said drum into a second position thereof; and latch means mounted on the support for movement to and from a position between the support and one of the rails for retaining the support in said locked position.

9. In combination with an elongated track having a pair of spaced rails, each provided with a side having a series of openings therein spaced longitudinally therealong, a mooring unit including a winch having a winding drum and tie means attached to the drum and adapted to be coiled therearound when the drum is rotated; a support journaling the drum and carried by the track between the rails; lateral projections on the support, each disposed in spaced relationship diagonally across said support normally out of engagement with said openings when the unit is in one position with respect to the rails to permit the unit to be shifted longitudinally of the track, said projections on the support being disposed to enter selected openings of a corresponding rail and thereby lock the support to the rails, when the unit is canted sidewise from said one position thereof about an axis substantially perpendicular to the axis of rotation of said drum into a second position thereof; latch means mounted on the support for movement to and from a position between the support and one of the rails for retaining the support in said locked position, said drum and said support being provided with pawl and ratchet means for releasably holding the drum against retrograde rotation; and a lever coupled with the pawl, said latch being disposed to hold the pawl released from the ratchet when the latch is moved away from said position between the support and the one rail, thereby rendering the winch inoperable until the latch is moved to its support-holding position.

10. In combination with an elongated track having a pair of spaced rails, each provided with a side having a series of openings therein spaced longitudinally therealong, a mooring unit including a winch having a winding drum and tie means attached to the drum and adapted to be coiled therearound when the drum is rotated; a support journaling the drum and carried by the track between the rails; lateral projections on the support, each disposed in spaced relationship diagonally across said support normally out of engagement with said openings when the unit is in one position with respect to the rails to permit the unit to be shifted longitudinally of the track, said projections on the support being disposed to enter selected openings of a corresponding rail and thereby lock the support to the rails, when the unit is canted sidewise from said one position thereof about an axis substantially perpendicular to the axis of rotation of said drum into a second position thereof; latch means mounted on the support for movement to and from a position between the support and one of the rails for retaining the support in said locked position, said drum and said support being provided with pawl and ratchet means for releasably holding the drum against retrograde rotation; a lever coupled with the pawl, said latch being disposed to hold the pawl released from the ratchet when the latch is moved away from said position between the support and the one rail, thereby rendering the winch inoperable until the latch is moved to its support-holding position, each of said sides of the rails being provided with an inturned flange; and a pair of opposed, outturned plates on the support between said sides and beneath said flanges, said plates terminating in spaced relationship to opposite ends on respective sides of said support, thereby permitting said canting of the unit.

References Cited in the file of this patent

UNITED STATES PATENTS

| | | |
|---|---|---|
| 594,456 | Brown | Nov. 30, 1897 |
| 1,498,087 | Fowler | June 17, 1924 |
| 1,791,744 | Osgood | Feb. 10, 1931 |
| 2,430,962 | Stamler | Nov. 18, 1947 |
| 2,736,272 | Elsner | Feb. 28, 1956 |
| 2,738,204 | Ibey | Mar. 13, 1956 |
| 2,859,710 | Elsner | Nov. 11, 1958 |
| 2,891,490 | Elsner | June 23, 1959 |